United States Patent

[11] 3,619,022

[72] Inventors: Peter M. Hirsch; James A. Jordan, Jr.; Louis B. Lesem, all of Houston, Tex.
[21] Appl. No.: 72,948
[22] Filed: Sept. 17, 1970
[45] Patented: Nov. 9, 1971
[73] Assignee: International Business Machines Corporation, Armonk, N.Y.

[54] METHOD OF MAKING AN OBJECT DEPENDENT DIFFUSER
8 Claims, 6 Drawing Figs.
[52] U.S. Cl. .................. 350/3.5, 350/162 R, 350/320, 161/3.5, 444/1
[51] Int. Cl. .................. G02b 5/02, G02b 27/00

[50] Field of Search .................. 350/3.5, 162 R, 162 SF, 320; 161/3.5

[56] References Cited
UNITED STATES PATENTS
3,539,241  11/1970  Upatnieks .................. 350/3.5

OTHER REFERENCES
Gerritsen et al., Applied Optics, Vol. 7, No. 11, Nov., 1968, pp. 2,301–2,311
Lesem et al., IBM Jour. of Research & Development, Vol. 13, No. 2, Mar., 1969, pp. 150–155

Primary Examiner—David Schonberg
Assistant Examiner—Ronald J. Stern
Attorneys—Hanifin and Jancin and John L. Jackson

ABSTRACT: A technique for making optimized phase objects which can uniformly diffuse the information content in a physical wave front across a defined recording plane.

PATENTED NOV 9 1971 3,619,022

INVENTORS
PETER M. HIRSCH
JAMES A. JORDAN, JR.
LOUIS B. LESEM

BY John L. Jackson

ATTORNEY

METHOD OF MAKING AN OBJECT DEPENDENT DIFFUSER

Given the object information which is to be diffused across the recording plane, the required illumination pattern is calculated digitally, in the preferred embodiment. The illumination pattern is formed by assuming the proper phase distribution.

The phase distribution is obtained by (1) using an initial random phase distribution to calculate the wave front, (2) altering the resultant wave front by dividing out amplitude variations to obtain the phase distribution, (3) calculating the inverse transform of the altered wave front to obtain a new object wave front with a new amplitude and a new phase distribution, (4) using the initial object amplitude and new phase distribution to calculate a new object wave front and (5) repeating the above until the mean amplitude deviation across the object falls within acceptable limits.

Once the optimized phase distribution has been digitally calculated, a plot tape is written for a plotter in which the phase distribution is scaled from 0 to $2\pi$ over the available gray levels. The plotter produces a photographic film, the darkening of which over its area is a measurement of phase. The thus produced film is photoreduced to the size appropriate for the wavelength of the incident wave front and for the image. The photoreduction is then etched such that the photoreduction is of uniform transmittance but with an etched surface, the depth being proportional to emulsion darkening. The result is an optimized phase plate for diffusion of information about the given image.

CROSS-REFERENCE TO RELATED APPLICATIONS

The following related applications by the inventors of the present application and assigned to the common assignee have been filed:

Ser. No. 778,525, entitled, The Kinoform, Method of Manufacturing Wave Shaping Devices, filed Nov. 25, 1968, covers the basic kinoform approach in which random phase factors are employed to produce a phase object having a single ordered image.

Ser. No. 774,977, entitled, Discrete Aperture Method of Making Synthetic Kinoforms and Holograms, filed Jan. 29, 1969, covers a technique of making computer-generated holograms or kinoforms in which the object wave front is calculated by assuming a regular lattice of apertures of variable darkening.

BACKGROUND OF THE INVENTION

1. Field of the Invention

This invention relates to holograph, computer-generated holograms, and kinoforms, and more particularly, to a technique in which information in an object may be uniformly diffused across the recording plane of a holographic-type member.

2. Description of the Prior Art

One of the common problems of holography relates to the diffusion of information about the object being "holographed" into all parts of the hologram recording plane. If information is uniformly diffused, the virtual image viewed by looking through the hologram will be of high quality for all viewing angles. In information is not uniformly diffused, the virtual image will have a mottled appearance because of gaps in the information, which effect has frequently been termed the "speckle effect."

In the early work, holograms were made by illuminating a transparency with quasi-monochromatic light. The object was simply the blackening of the transparency. No provision was made to diffuse information into all portions of the hologram, with the result that the information was concentrated in the geometrical shadow of the object. In general, even in the holograms made by the twin-beam methods but without a diffuser, the virtual image is confined to a very small viewing angle.

In later work it became clear that some sort of phase object could be used to provide some of the needed diffusion information. Typically, Scotch Tape was used as a phase object and provided diffusion by breaking up the phase distribution of the illumination wave front. This latter is achieved by introducing variations in the optical path length for contiguous elements of the object. This can be done by varying the index of refraction or by varying the thickness of the diffuser. In the case of reflection from three-dimensional objects, there is already some diffusion because of the inherent roughness of most surfaces. The holograms made using a diffuser or made from the reflected wave front from a three-dimensional object are much improved over those using no diffuser. However, the images viewed at any one viewing angle show gaps of information about the object, resulting in the aforementioned mottled appearance.

Attempts have been made to find more controlled diffusers which will give a better appearance in the final image. Two such attempts are given in "Imagery with Pseudo-Random Diffused Coherent Illumination" [E. N. Leith and J. Upatnieks, Appl. Opt. 7, 2,085–2,089 (1968) and in "Use of a Random Phase Mask for the Recording of Fourier Transform Holograms of Data Masks" (C. B. Burckhardt, Appl. Optc. 9, 695 –700)]. Additionally, the inventors have described a method of achieving diffusion of a wave front in the referenced application "Discrete Aperture Method of Making Synthesized Kinoforms and Holograms" Ser. No. 794,977, filed Jan. 29, 1969, and assigned to the assignee of the present application. The Leith-Upatnieks paper describes a crossed grating system which eliminates noise due to line imperfections. The Burckhardt paper describes a diffuser which is binary; i.e., one which shifts the phases in a random manner by 0° or 180°. In Ser. No. 794,977, phases are shifted in a random manner by random phases ranging between 0° and 360°. All of these methods improve the appearance of the image, but it can be shown that there are still variations in the energy diffused across the recording plane, where the mean variation in the latter two cases is about 20 percent.

SUMMARY OF THE INVENTION

Briefly, in the preferred embodiment an object dependent diffuser can be manufactured as follows:

An illumination pattern is formed by assuming the proper phase distribution for the object which is to be recorded.

This phase distribution is obtained by (1) using an initial random phase distribution to calculate the wave front as:

$$W(x_l) = \sum_{j=-\frac{N}{2}}^{\frac{N}{2}-1} T(a_j) e^{iR(a_j)} e^{\frac{i\pi}{\lambda \Phi}(j\Delta a - l\Delta x)^2} \quad (1)$$

(2) altering the resultant wave front by dividing out amplitude variations to obtain phase distribution as:

$$W'(x_l) = \frac{W(x_l)}{A(x_l)} \quad (2)$$

(3) calculating the inverse transform of the altered wave front to obtain a new object wave front having the same amplitude as the original wave front but with the new phase distribution as:

$$T'(a_j)e^{iRa'(j)} = \sum_{l=-\frac{N}{2}}^{\frac{N}{2}-1} W'(x_l) e^{-\frac{i\varphi}{\lambda \Phi}(j\Delta a - l\Delta x)^2} \quad (3)$$

and (4) repeating the above sequence with $R'(a_j)$ substituted for $R(a_j)$ until the mean amplitude deviation across the object falls within acceptable limits as:

$$\| T'(a_j) - T(a_j) \| \leq e \quad (4)$$
$$\hat{T}$$

Once the optimized phase distribution has been calculated, a plot tape is written for a plotter in which the phase distribution is scaled from 0 to $2\pi$ over the available gray levels. The plotter produces a photographic film, the darkening of which over its area is a measurement of phase. The thus produced film is photoreduced to the size appropriate for the wavelength of the incident wave front and for the image. The photoreduction is then etched such that the photoreduction is of uniform transmittance but with an etched surface, the depth being proportional to emulsion darkening. The result is an optimized phase plate for diffusion of information about the given image.

BRIEF DESCRIPTION OF THE DRAWINGS

FIG. 2($b$) illustrates the scatter of light by an object without a diffuser;

FIG. 2($c$) illustrates the amplitude distribution when a random phase distribution is introduced in the illumination;

DETAILED DESCRIPTION OF THE DRAWING

Figure 1:
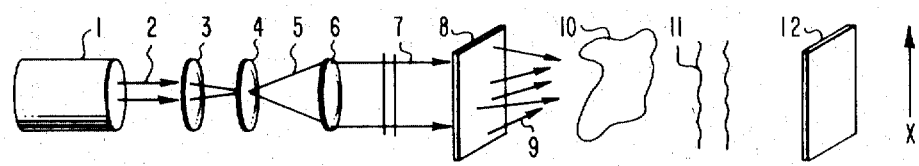
FIG. 1 is a generalized illustration of a technique employed for diffusing information about an object onto a recording plane.

In FIG. 1 is shown a generalized illustration of a technique for diffusing information about an object across some plane. As shown, a light source 1 such as a laser emits light rays 2 which are imaged by means of a microscope objective onto a pin hole member 4. The light 5 passing through the pin hole is collimated by lens 6 to provide parallel rays 7 which are diffused into rays 9. The rays 9 illuminate the object 10 to provide waves 11 which are recoded at the recording plane on, for instance, film 12. The present invention provides a technique for manufacturing the diffuser 8 such that it is object dependent. Object dependent as used herein means that the diffuser is idealized to the object as distinguished from the usual prior art filter which did not take into account the makeup of the object. Further as will become apparent from the following description the diffuser, as illustrated in FIG. 1, may be utilized in an optical recording system.

Figure 2A:
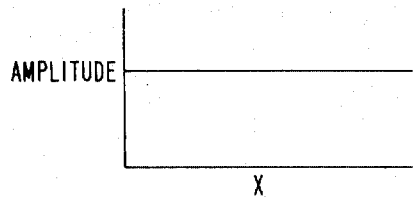
FIG. 2($a$) illustrates the amplitude distribution provided by using an object dependent iterative diffuser.
Figure 2B:
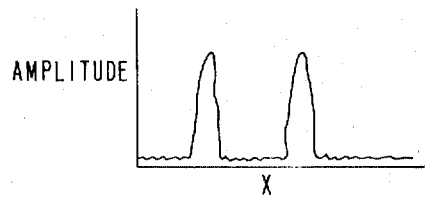
Figure 2C:
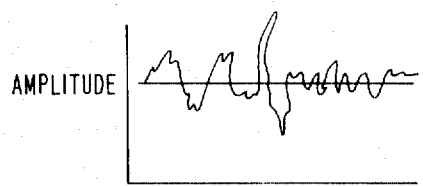

Refer next to FIG. 2($a$) which illustrates the ideal result achieved through use of an object dependent filter. As shown, the amplitude of the information to be recorded is uniform across the recording plane.

Refer next to FIG. 2($b$) which graphically illustrates the results of the scattering of light by an object without using a diffuser. Because of the well-known laws of diffraction from edges, the illumination is scattered by the object such that the amplitude of the scattered wave front in the recording plane is restricted to the area close to the geometrical shadow of the object. As is well know, this effect is caused by the illumination having constant (or slowly varying) phase across all of the object.

In FIG. 2($c$), there is graphically illustrated the results obtained from the method described in the prior art of Burckhardt and of Hirsch, et al. As described therein, the diffuser introduces a random phase change in the illumination wave. As is well known [see e.g., D. Kermisch, "Image Reconstruction from Phase Information Only," J. Opt. Soc. Am. 60, 15–17 (1970)], a randomphase change leads to a mean deviation in the amplitude of the scattered wave front of about 20 percent.

Figure 3:
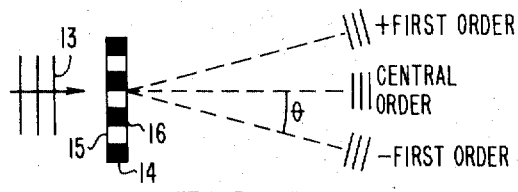
FIG. 3 is an illustration of phase retardation to produce defraction.

To illustrate that phase variations can provide diffusion of information, refer next to FIG. 3 in which is shown a phase grating 14 having incident thereon parallel rays of light 13. The strips 16 introduce a phase change $\Delta\Phi$ and strips 15 introduce no phase change in the illumination wave front 13. As is well known from the theory of diffraction gratings, some of the incident illumination proceeds through the grating undisturbed to form the so-called central order. Other light is deflected through an angle $\theta$ according to the "grating equation," $n\lambda = d \sin \theta$, where n is the diffraction order (n equals a positive or negative integer), $\lambda$ is the wavelength of illumination 13, $d$ is the grating period and $\theta$ is the diffraction angle. For simplicity, only the plus first order and the minus first order are shown in FIG. 3. Knowing therefore that phase changes can spread information, the problem becomes one of making a phase object which accurately controls the process.

Figure 4:
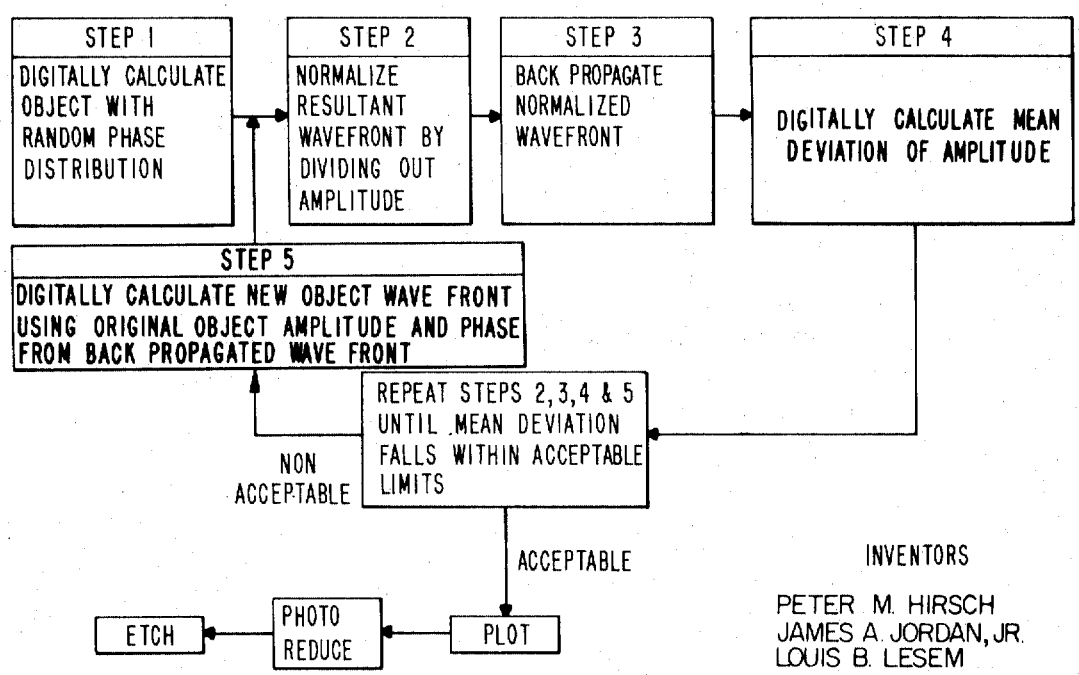
FIG. 4 is a flow diagram illustrating the steps taken to provide an object dependent iterative diffuser.

The general procedure of the subject novel invention to give the results shown in FIG. 2$a$ consists of the steps set forth in FIG. 4. The first step is to define the object 2. The object is determined by a function $T(x,y,z)$ which gives the complete transmittance or reflectance of the object as a function of the spatial coordinates $x,y,z$. It is convenient to relate the space coordinates $x,y,z$ to the spatial frequency coordinates $\nu_x, \nu_y, \nu_z$ by recalling that the phase grating 14 of FIG. 3 has a spatial frequency given by the reciprocal of the grating period; i.e., $\nu = 1/d$.

Let $T(x,y,z)$ be sampled at a rate greater than the highest significant spatial frequency in its Fourier transform $T(\nu_x, \nu_y, \nu_z)$. For physical sampling, say with optical waves, a mask having a regular array of apertures with spacing of less than half of the period of the highest significant spatial frequency component can be employed.

The actual diffuser is a second phase mask with a regular array of sampling squares. The phase retardation $\Delta\Phi$ in each of the squares differs according to a particular object-dependent prescription. In this prescription, each sample aperture in the mask overlaying the object $T(a)$ is assigned a phase from a uniform set of random numbers. The wave front from an object given by $T(a) e^{iR(a)}$ is digitally calculated for the recording plane. The analysis herein is given in one dimension, but it will be obvious to one skilled in the art that it can be extended easily to three dimensions. In the well-known finite sum representation of the Fresnel approximation to diffraction theory, the wave front may be calculated by the expression $$W(x_l) = \sum_{j=-\frac{N}{2}}^{\frac{N}{2}-1} T(a_j) e^{iR(a_j)} e^{\frac{i\pi}{\lambda z}(j\Delta a - l\Delta x)^2} \quad (1)$$

where the wave front is evaluated over a regular lattice with spacing $\Delta x$. To be more specific, the equation gives an expression for the complex value of the wave front W at the sample point $x_l$ as the sum of contributions from the N sample points, designated by $a_j$. In the equation, $\lambda$ is the wavelength of the illuminating wave front, $\Delta x$ is the center-to-center spacing between samples of the wave front W while $\Delta a$ is the center-to-center spacing between samples in the object T; $z$ is the distance from the object plane to the wave front plane; $T(a_j)$ is the amplitude in the object, and $\Delta a$ is the spacing in the object plane. In the further analysis of the wave front, it will be assumed that the wave front W is evaluated over N samples. As mentioned before, statistical analysis shows that the amplitude A of the wave front W evaluated over N samples will have a mean deviation of about 20 percent from some constant A. That mean deviation can be reduced if the wave front $W(x)$ is altered by dividing out the amplitude variations; that is, a new wave front is constructed by performing the digital calculation $$W'(x_l) = \frac{W(x_l)}{A(x_l)} \quad (2)$$

Now the digital calculation of the inverse transform of $W'(x)$ is performed to get an adjusted description of the object and phase distribution $$T'(a_j) e^{iRa'(j)} = \sum_{l=-\frac{N}{2}}^{\frac{N}{2}-1} W'(x_l) e^{-\frac{i\varphi}{\lambda z}(j\Delta a - l\Delta x)^2} \quad (3)$$

where the definitions are given above. In general, $T(a_j)$ $T'(a_j)$ and the mean deviation of $T'(a_j)$ from $T(a_j)$ is digitally calculated to form $M=\Sigma[T'(a_j)-T(a_j)]^2$. If M is not sufficiently small —an arbitrary definition usually based on the perceptual characteristics of the viewer —then the calculations of eqs. 1,2, and 3 are performed for a new complex object $T(a_j)eiR'(a_j)$. The digital calculations may be repeated for many iterations to bring the mean deviation given by eq. 3 to an arbitrarily small value.

Summarizing the above calculations, equation (1) is the first step of the novel iteration technique in which the initial phase distribution, during the first iteration, is selected from a uniform set of random numbers and used to compute the wave front which would be scattered by the object; equation (2) represents the normalizing of the amplitude of the resultant wave front by forcing all amplitudes to be equal to provide the phase distribution $e^i$ or normalized wave front; equation (3) defines the back propagation of the normalized wave front to produce an image having a new amplitude and phase distribution in the object. The new amplitude distribution is compared with the initial (desired) distribution. These steps are then repeated with the initial amplitude distribution and new phase distribution until the mean deviation in the new amplitude from the initial one in the least squares (r.m.s.) sense falls with acceptable levels.

The meaning of this digital calculation is that the mask required to give the wave front with constant amplitude 5 can be made by assigning the sample squares the phases $R'(a_j)$ which minimize the mean deviation in the wave front at the recording plane.

It will be appreciated by those skilled in the art that the previously described iterative technique can be used either with kinoform systems in which case the image is defined as a number of image points each having a specified amplitude or the wave front from the object can be physical, as for instance when the wave front from an object is to be diffused across a recording plane. Additionally, in the latter case, for instance, the wave front may be from an array of transducers such as in ultrasonic applications.

Further, with respect to the calculation of the wave front, the first iteration is identical to the kinoform calculation in Ser. No. 778,525. The primary difference between the subject technique and that of the kinoform and which makes the diffuser function to provide an object dependent diffusing element which can reduce the mean amplitude deviation across an arbitrary plane to less than 1 percent is the utilization of the thus-calculated phase and the original object amplitude in a series of iterations to provide an optimized phase distribution.

In the preferred embodiment, in which the illuminating wave front is assumed to be monochromatic visible light, the mask may be made by plotting the final phase distribution $R'(a_j)2\pi$, over 64 gray levels of a photographic plotter and the diffuser mask is made by photoreducing the computer-generated photographic plot to the size appropriate for the object $T(a_j)$. The photoreduction is made onto a photographic film such as Kodak Minicard. The film is prehardened using Kodak Special Hardener SH1 according to the recipe a. Water 500 cc.
b. Formaldehyde 10 cc.; 37 percent solution by weight
c. Sodium Carbonate; monohydrated 6 grams
d. Water to make 1,000 cc.

After normal development, the film is subjected to an etch bath with two components:

Component A
  100 cc. acetic acid
  285 cc. water
  100 grams cupric nitrate
  4.9 grams potassium bromide
  water to make 1,000 cc.
Component B
  30 percent peroxide The two components are mixed by placing 10 cc. of component B in 100 cc. of water and adding 100 cc. of component A. The effect of the etch bath is to make the film transparent, but more importantly to make a relief image in which the depth of relief is proportional to the original exposure of the film. If the exposure and time of etching are properly controlled, the retardation of a wave front in the thickest regions will be exactly $2\pi$ radians relative to the wave front moving through the same thickness of air. The result is the required phase object which gives the final phase distribution $e^{iR(a)}$.

It will be obvious to those skilled in the art that the embodiment described above is one of many methods of introducing phase changes in a controlled manner. For example, phase changes can also be made by changing the optical path length in a material. This may be done by making selective changes in the index of refraction of photographic techniques, by ion implantation and by other methods. Furthermore, relief images can be achieved in glass or other solid substrates by selectively etching regions using well-known photoresist/etching procedures. The mask may be reflective rather than transmissive. In this case, the phase change achieved with a given relief D is $4\pi/D$ radians. Reflective masks can be made by coating a relief surface made according to the methods described above, by vapor deposition, etc.

It will also be obvious to those skilled in the art that although the preferred embodiment was cast in terms of visible light, in face the method is applicable to the diffusion of any physical wave, be it electromagnetic or mechanical, including infrared radiation, microwaves, radiofrequency electromagnetic wave, ultrasonic waves, acoustic waves, and infrasonic waves in which case the member may for instance be formed by means of a numerically controlled milling machine.

In the claims:

1. The method of constructing a diffuser which will provide an object dependent wave front of nearly constant amplitude at an arbitrary plane comprising the steps of:
   A. calculating by machine the phase distribution from said object by:
      1. specifying the amplitude of each object point and assigning a random phase factor according to a uniform set of random numbers to each such point,
      2. calculating the form at said arbitrary plane of the wave front which would propagate from an object having said specified amplitude and phase, and
      3. setting all the amplitude factors in said calculated arbitrary plane wave front to a uniform value so as to produce a normalized wave front having only phase information;
   B. back propagating said normalized wave front to produce a new wave front at the location of said object,
   C. comparing the amplitude distribution of said new wave front with the amplitude distribution of said object points calculated in step (A)2.
   D. calculating the form at said arbitrary plane of the wave front which would propagate from an object having the amplitude distribution of step (A)1 and the phase distribution from the said new wave front of step (B).
   E. repeating steps D, A(3), (B) and (C) until the mean deviation between the amplitude distribution of said new wave front at said object location and the amplitude distribution of said specified object falls within acceptable levels, and constructing said diffuser having controlled phase retarding areas in accordance with the phase distribution of said normalized wave front.

2. The method of claim 1 wherein said step of back propagating is accomplished by calculating the inverse transform of said normalized wave front.

3. The method of claim 2 wherein said mean deviation of said amplitudes is defined in the least squares sense.

4. The method of claim 3 wherein said image points are places so as to define a continuous function.

5. The method of claim 4 wherein said object is constructed by plotting said required phase as amplitude on a multigrey level plotter, photoreducing said plot onto a film and etching the resultant film.

6. A method of diffusing a wave front from an object across an arbitrary plane, comprising the steps of:
constructing a diffuser having selective phase-retarding areas in accordance with required phase distribution calculations based on the wave front from said object, said required phase distribution calculated in a machine by:
calculating the wave front at said arbitrary plane using the amplitude factors in said wave front from said object and phase distribution selected from a uniform set of random numbers,
setting all the amplitude factors in said calculated arbitrary plane wave front to a uniform value so as to produce a normalized wave front having only phase information,
back propagating said normalized wave front to provide a new wave front at the location of said object;
using the original object amplitude factors and the phase distribution of said new wave front to provide a new object wave front, and;
repeating the above steps until the mean deviation between the said original object amplitude factors and the amplitude distribution of said new wave front fall within acceptable levels, the phase distribution in said new wave front being said required phase distribution.

7. The method of claim 6 wherein said step of back propagating is accomplished by calculating the inverse transform of said normalized wave front.

8. The method of claim 7 wherein said mean deviation of said amplitudes is defined in the least squares sense.